Figure 1:
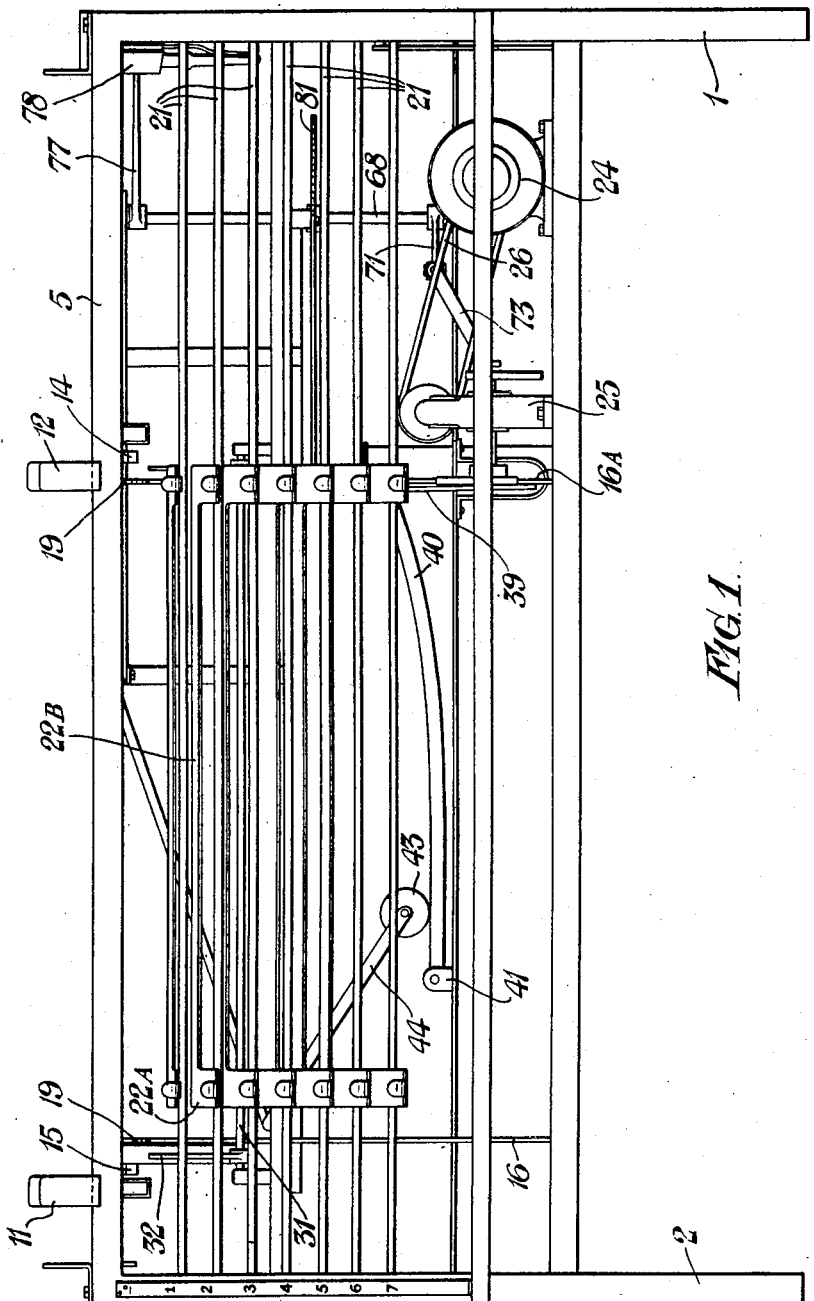

Jan. 8, 1952 W. R. OYSTON 2,581,698
WEIGHT PER UNIT LENGTH SORTING DEVICE
Filed Nov. 4, 1948 4 Sheets-Sheet 1

Inventor
William R. Oyston
By Haseltine Lake + Co
Agents

Jan. 8, 1952 W. R. OYSTON 2,581,698
WEIGHT PER UNIT LENGTH SORTING DEVICE
Filed Nov. 4, 1948 4 Sheets-Sheet 2
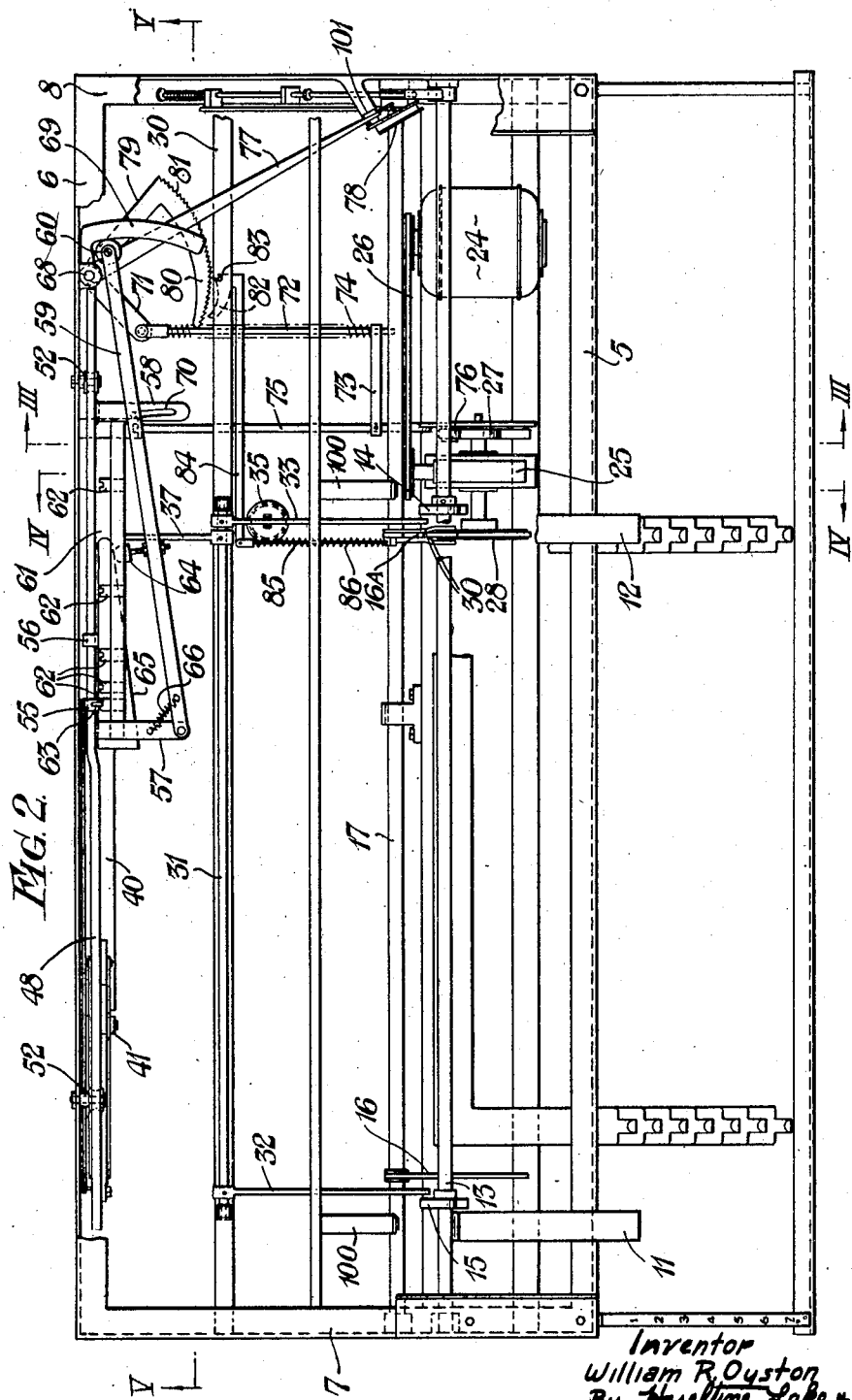
Inventor
William R. Oyston
By Haseltine, Lake & Co.
Agents Jan. 8, 1952 W. R. OYSTON 2,581,698
WEIGHT PER UNIT LENGTH SORTING DEVICE
Filed Nov. 4, 1948 4 Sheets-Sheet 3
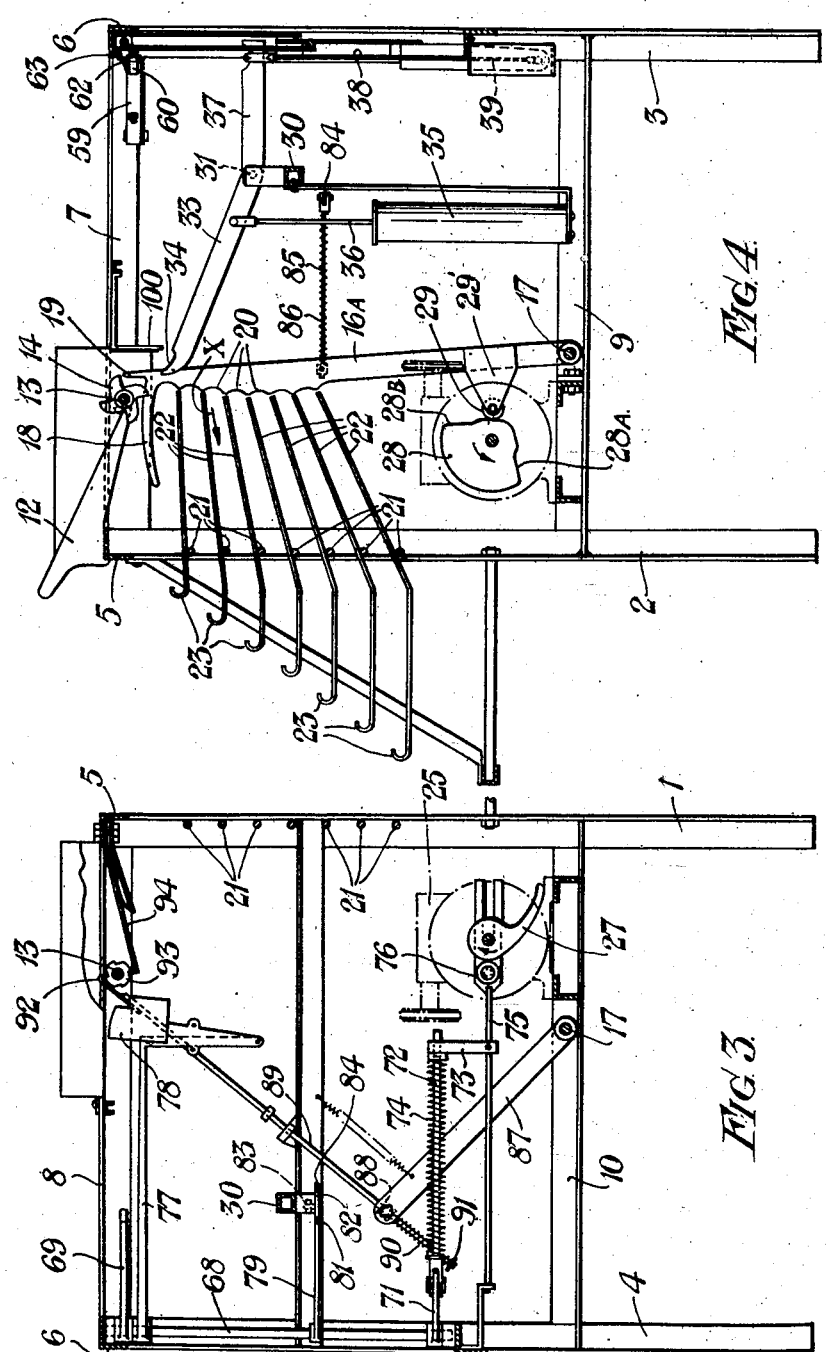
Inventor
William R. Oyston
By Haseltine, Lake & Co.
Agents Patented Jan. 8, 1952

2,581,698

UNITED STATES PATENT OFFICE 2,581,698

WEIGHT PER UNIT LENGTH SORTING DEVICE

William Robert Oyston, London, England, assignor to The Hewson Manufacturing Company Limited, London, England Application November 4, 1948, Serial No. 58,184
In Great Britain November 6, 1947

7 Claims. (Cl. 209—75)

1

This invention relates to machines for classifying tubes, rods and the like according to the weight thereof. It is to be understood that the machine of the invention is primarily intended to classify glass tubes according to weight per unit length thereof, but the invention is nevertheless generally applicable to classification of pieces of stock according to the weight per unit length of the stock. In the description that follows, reference will be principally made to glass tube, but it will be comprehended that specific reference to the nature of the stock is made by way of example, or for simplicity of language.

Glass tubes are usually manufactured in nominally standard lengths with various external diameters. It is found that in a batch of tubes of nominally the same diameter and nominally the same length, the weight of the individual tubes differs by a variable amount. This variation may prove very disadvantageous where the tubes are used in subsequent manufacturing operations which rely upon a knowledge of their weight per unit length. It accordingly becomes desirable to grade the tubes according to the weight per unit length of material that there is in each of the nominally identical tubes of a batch. It is an object of the invention to provide a machine which will automatically determine the weight per unit length of individual tubes, and which will automatically grade them according to such weight.

Broadly in accordance with the invention there is provided a machine for classifying tubes, rods and like pieces of stock according to the weight per unit length of the pieces of stock, comprising a hopper or magazine for the stock to be classified, means for individually feeding a piece of stock automatically from said hopper or magazine, length measuring means for measuring the length of a piece of stock fed by said feeding means, a weighing device to which the pieces of stock are individually fed, such weighing device being arranged for compensation by the length measuring means so as to compensate for varying lengths in the pieces of stock, and several chute openings in number corresponding to the number of desired classifications of stock to be made, such chute openings being disposed one above the other and the weighing device being such that in the weighing of a piece of stock the latter is moved a distance depending on the weight of the piece of stock, to bring the weighed piece of stock opposite an appropriate chute mouth into which it can be discharged.

For a better understanding of the nature of

Figure 5:
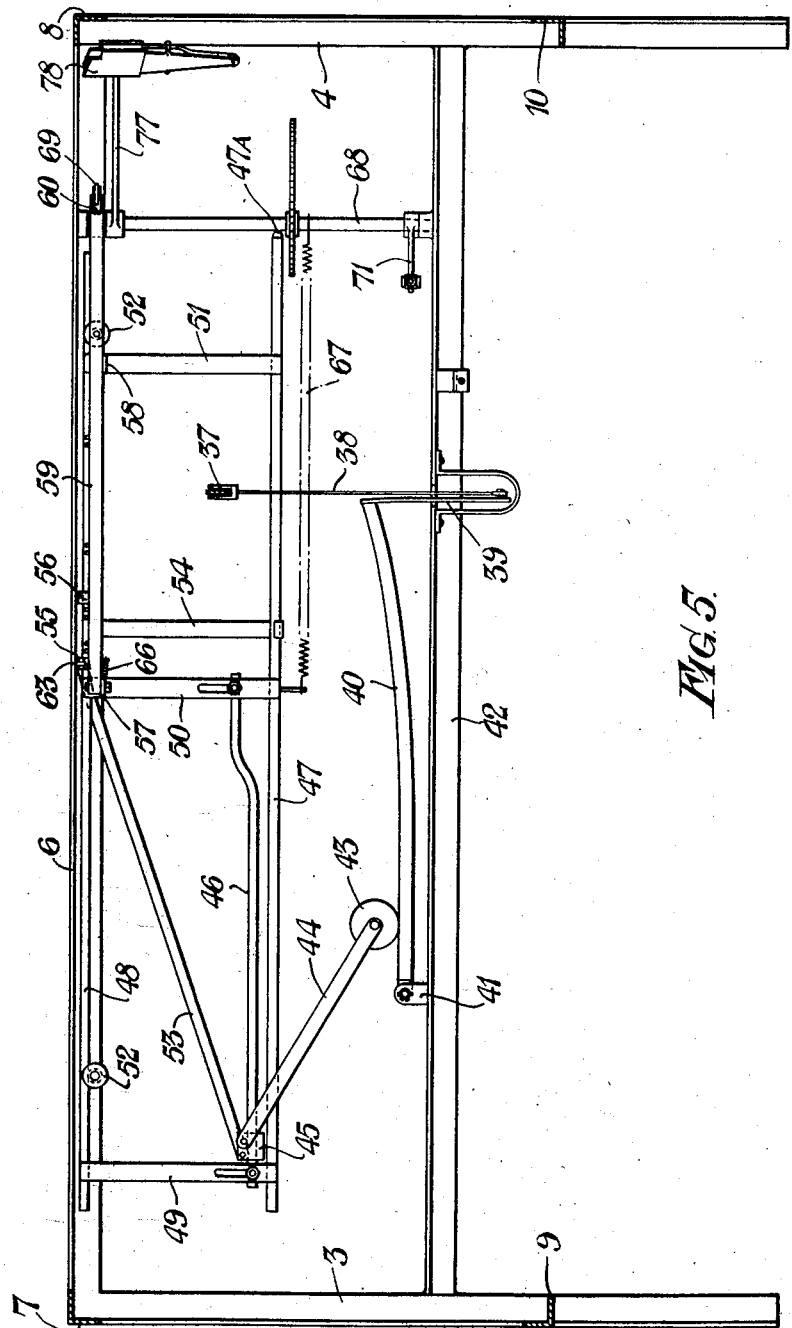

2 the invention and to show how the same may be carried into effect, reference will now be made to the accompanying drawings, in which, Figure 1 is a front elevation of an example of a machine made in accordance with the invention, Figure 2 is a plan view corresponding to Figure 1, Figure 3 is a section on the line III—III of Figure 2, Figure 4 is a section on the line IV—IV of Figure 2, and, Figure 5 is a section on the line V—V of Figure 2.

The machine shown in the illustrated example has a frame formed from principal uprights 1, 2, 3 and 4, which are joined at their upper ends by longitudinal members 5 and 6, and by transverse members 7 and 8.

There are further transverse members 9 and 10 which are arranged parallel to, but below, the members 7 and 8, and likewise there are further longitudinal members. The longitudinal member 5 has two spaced brackets 11 and 12 secured to it, these brackets having upper surfaces which incline downwardly, (see Figure 4) towards a shaft 13 carrying a pair of spaced star-wheels 14 and 15. The brackets 11 and 12 together act as a hopper or magazine for the reception of tubes to be classified, the star-wheels 14 and 15 being provided to act as automatic feeding means for feeding one tube at a time from the hopper onto a pair of spaced arms 16 and 16A, both supported for pivotal movement upon a shaft 17. The shape of both arms 16 and 16A is the same, and as seen best in Figure 4, each arm has a long forwardly projecting finger 18 and a short upstanding finger 19, whilst there are several adjacent arcuate recesses 20 on the forward edge of each of the arms 16 and 16A. It will be noted from Figure 4 that there are, in this example, seven recesses, the reason being that the machine is intended to produce classification of the tubes into seven grades. Each grade is associated with a discharge chute, so that there are seven discharge chutes. As seen best in Figure 1, there are seven rods 21 disposed between the uprights 1 and 2, these rods serving to space and support an equal number of chute members 22. The exact shape of each one of the latter is unimportant, but in the illustration of Figure 1 they are shown as being of U-shape. Thus the second chute member shown in Figure 1 has the two parallel portions of the U-shape at 22A and the transverse portion at 22B. As seen in Figure 4, each chute has an inclined part and a substantially horizontal part, which latter terminates in hooked ends 23, which retain tubes that enter the mouth of the chute.

An electric motor 24 provides the operating power for the machine, the motor driving a reduction gear 25 through a belt 26 (Figs. 1 and 2). The gear 25 drives two cams 27 and 28, the latter co-operating with a follower-roller 29 supported between trunnion plates 29' attached to the arm 16A. From Figure 4 it will be clear that in each revolution of the cam 28 the arm 16A will be thrust back and forth under the action of the roller 29. The arm 16A is fast upon the shaft 17, as is also the arm 16, so that the latter will follow the movements of the arm 16A.

A longitudinal member 30 has bearings to support freely a shaft 31 to which arms 32 and 33 are fixedly attached. The extremities of the arms 32 and 33 have recesses 34 (Fig. 4) for the reception of a tube to be classified, these arms constituting the weighing arms of the machine. One of the arms 33 is associated with a dashpot and plunger damping mechanism, the dashpot 35 being seen best in Figure 4. The plunger rod 36 is pivotally attached to the arm 33. The shaft 31 has another arm 37 secured to it, the extremity of this arm possessing a notch for reception of a stirrup located at one end of a fine cable 38, the other end of which is anchored to the lower extremity of a strip 39 attached to one end of a beam 40 (Fig. 5). The latter is pivotally mounted in a trunnion bracket 41 fixedly carried upon a longitudinal frame member 42 (shown only in Figure 5) disposed at the back of the machine. A weighing roller 43 rides upon the upper surface of the beam 40, the roller being attached to the lower end of a link 44, which link has its upper end pivotally connected to a block 45. The latter is slidably mounted on a rod 46 which is adjustably fixed in a frame comprising two longitudinal members 47 and 48 with transverse members 49, 50 and 51 (see Fig. 5). The frame is slidable horizontally in the vertical plane which contains it, there being rollers 52 upon which the longitudinal member 48 is supported, such rollers being turnable about axes fixed in relation to the main machine framework. The block 45 is connected by a rod 53 to a T-shaped member having an arm 54 and two slidable collars 55 and 56, the latter being located on the longitudinal member 48, whilst the lower extremity of the arm 54 embraces slidably the member 47.

The member 48 has two laterally extending integral arms 57 and 58 (see Fig. 2) the arm 57 having one extremity of a rod 59 secured pivotally to it, the other extremity of such rod being provided with a roller 60. The arms 57 and 58 are joined by a strip 61 which carries five laterally projecting forked members 62. The collar 55 has a pivotal finger 63 which can be entered in any one of the forked members 62. The arm 59 carries an adjustably fixed contact piece 64 which co-operates with the inclined face 65 of a plate effectively integral with the T-shaped member possessing the arm 54 and collars 55 and 56. A spring 66 serves to ensure that the contact piece 64 is held in engagement with the face 65, whilst a spring 67 urges the displaceable frame having the longitudinal members 47 and 48 towards a vertical spindle 68, the appropriate end of the member 47 having a rubber buffer 47A thereon to cushion its contact with the spindle.

The rod 59 has its roller 60 in contact with the concave curved surface of an arm 69 fixed upon the spindle 68. The rod can swing about its point of pivotal attachment to the arm 57 and has a guide pin which enters an arcuate slot 70 formed in the arm 58 (Fig. 2). The spindle 68 is oscillated by an arm 71 fixed thereto, the end of such arm being pivotally connected to one extremity of a rod 72, the other extremity of which slides in an arm 73. A spring 74 surrounds the rod 72 and ensures that movement imparted to the arm 71 is non-positive. The arm 73 is fastened to a rod 75 which is slidably arranged and which has a follower roller 76 co-operating with the cam 27 (see Fig. 3).

An arm 77 is also fixed upon the spindle 68, the free extremity of this arm carrying a pad 78 intended for engagement with one end of the glass tubes for classification. A further arm 79 is secured to the spindle 68, such arm having an integral segmental portion 80 formed with ratchet teeth 81. A pawl 82 is arranged for engagement with the teeth 81, the pawl being pivotally supported as at 83 upon the longitudinal machine frame member 30 (Figs. 2 and 3). The pawl is under control of a lever 84 the free end of which is pivotally attached to one end of a rod 85, the other end of which slidably enters a small boss formed on the arm 16A. A spring 86 surrounds the rod 85 and ensures that motion is communicated to the lever 84 in a non-positive manner.

As seen best in Figure 3, the shaft 17 has secured to it a lever arm 87, the free extremity of which carries pivotally a collar 88. A rod 89 passes slidably through the collar, the rod being associated with a spring 90 which bears against the collar 88 and against a washer 91 fixed to the rod. At the extremity of the rod 89 a pawl 92 is fixed thereto, such pawl co-operating with a ratchet wheel 93 secured to the shaft 13 and having only four teeth. There is an additional pawl 94 engaging the ratchet wheel 93, which ensures that the latter can turn only in an anti-clockwise direction (as viewed in Figure 3). It will be obvious from Figure 3 that a movement of the lever arm 87 in an anti-clockwise direction will cause the rod 89 to be displaced downwardly under the action of increasing spring pressure in the spring 90 with the result that the pawl 92 will be displaced to move the wheel 93, whereby the latter is turned in an anti-clockwise direction (as viewed in Figure 3.)

The general operation of the machine so far described will now be indicated. Lengths of glass tube to be classified, are placed in the hopper principally constituted by the members 11 and 12. The motor 24 is set in operation and hence the cams 27 and 28 are caused to revolve at reduced speed. In one revolution of the cam 28, the levers 16 and 16A are moved backwardly (as viewed in Figure 4), and then returned to their forward position. An oscillation of the shaft 17 produces correspondingly an oscillation of the lever arm 87 with the result that the shaft 13 is turned through one quarter of a revolution. The star-wheels 14 and 15 are similarly turned through a quarter of a revolution. It is to be observed that each star-wheel has four teeth so that one glass tube is fed from the hopper onto the fingers 18 of the levers 16 and 16A, for each revolution of the cams 27 and 28. The feed of a tube takes place as the arms 16 and 16A begin to move backwards and further movement of the arm 87 results in a lost motion permitted by the spring 90. There are fixed stops 100 (see Figure 4) which prevent the backward movement of a glass tube to an extent beyond the point at which the tube contacts the stops 100. The arms 16A and 16 do, however, continue to move with the result that the tube which they momentarily support is held against the stops 100 until the fingers 18 no longer support the tube, and the tube then drops into the recesses 34 of the weighing arms 32 and 33. The latter than swing downwardly from the upper position indicated in Figure 4, under the action of the weight of the tube which they support.

During the time that a tube is released from the hopper and is supported upon the arms 16 and 16A the length of the tube is gauged. Just before the tube is discharged from the hopper, the arm 77 occupies the position indicated in Figure 2, where it lies in an extreme position and engages a fixed stop 101. With the revolution of the cam 27 it is clear that the rod 75 will be forced backwardly and will, through the intermediary of the spring 74, cause the arm 71 to be swung in a clockwise direction as seen in the plan view of Figure 2. Thus the arm 77 will be swung in a clockwise direction so that the pad 78 will be brought to engage the right-hand end of a tube whilst the latter is still supported upon the fingers 18, the left-hand end of the tube being then closely applied to some convenient stop surface in the machine. The cams 27 and 28 are shown in their correct relative positions in Figures 3 and 4 (arrows thereon indicating their direction of motion), and it will be noted that whilst during the angular revolution of the cam 27 to the point where the follower 76 has reached maximum displacement, for the same angular motion of the cam 28, the follower 29 will only just be commencing to encounter the steep rise 28A upon its cam 28. Thus the measuring movement of the arm 77 controlled by cam 27, will be complete in the sense that the pad 78 thereon contacts the tube, before the tube drops upon the weighing arms 32 and 33. The last part of the backward motion of the arms 16 and 16A, corresponding to the riding of the follower 29 upon the incline 28A, will be a relatively great displacement of these arms 16 and 16A, the initial part of such displacement being sufficient only to cause the spring 86 associated with the rod 85 to move the lever 84 controlling the ratchet segment 80. The movement of the lever 84 will, as seen best in Figure 2, cause the pawl 82 to engage in the teeth 81 of the ratchet segment 80. At the same time the arm 77 is displaced to the point where the pad 78 thereon contacts the end of the tube. The angular displacement of the arm 77 will be precisely followed by the ratchet segment 80, so that when the pawl 82 engages the teeth 81 the arm 77 will be held (indirectly) by the pawl 82 from returning to its initial position shown in Figure 2. From the shape of the cam 28 shown in Figure 4, it can be seen that there is a very considerable dwell of the follower 29 upon the portion of the cam which is of greatest radius. Thus the levers 16 and 16A remain in their rearward position for a relatively great length of time. For this reason the pawl 82 remains engaged in the rack teeth 81 also for a considerable interval of time.

The spindle 68 which carries the arm 77 for length measurement, has also fixed upon it the arm 69 engaged by the free end of the rod 59. By virtue of the spring 67, it will be clear that the displaceable frame to which the rod 59 is connected, will cause the rod 59 to push upon the arm 69 and hence tend always to return the mechanism shown in Figure 2, to the position where the length measurement arm 77 contacts its fixed stop 101. The initial length gauging movement of the arm 77 causes the arm 69 to be moved in a clockwise direction (as seen in Figure 2), so that the rod 59 produces a translational movement of the movable frame to which it is attached, such translational movement being proportional to the angular displacement of the arm 69 and also, therefore, of the arm 77.

From the description of the operation so far given, it will be realised that when a tube drops from the supporting fingers 18 onto the weighing arms 32 and 33, the movement of the arm 77 indicative of length measurement, is complete and the corresponding translational adjustment of the weighing frame has been effected, and has been held by virtue of the co-operation of the pawl 82 with the teeth 81. The length measurement carried out by the arm 77 has, in fact, set the weighing roller 43 in a particular location upon the curved weighing beam 40. Before considering the effect of the adjustment made to the weighing frame, it is desirable to examine the underlying principles of the weighing system employed. Under the action of a tube received upon the arms 32 and 33, the arms move downwardly and the arm 37 has its free end swung upwardly a corresponding distance. Hence the flexible connection 38 causes the free end of the weighing beam 40 to be lifted (see Figure 5). During the lifting of the end of the weighing beam 40, the weighing roller 43 rides up the inclining surface of the weighing beam until a balance point is reached, when the weighing arms 32 and 33 no longer descend under the action of the weight of the tube supported thereby. It will be clear that the roller 43 progressively increases the torque opposing motion of the beam, until the torque due to the weight of the tube in the weighing arms producing such motion, is counter-balanced. In effect, during weighing, the roller 43 rises, and because it is constrained by the link 44, the roller moves relatively along the weighing beam and thereby increases its moment about the pivot of the weighing beam. If the beam were straight instead of curved, then for a given series of equiangularly spaced displacements of the weighing beam, the opposing moment of the weighing roller 43 about the pivot of the beam would not proportionately increase by equal amounts. It is therefore necessary to curve the weighing beam so that with increasing angular displacement thereof about its pivot, there is an approximately proportional increasing resisting moment offered by the roller 43. It is to be noted that the approximate proportionality is all that is required for practical purposes. Thus the beam 40 may be made an arc of a circle, the arc being of a radius that is large compared with the length of the link 44. It will of course be noted that it is important that the centre of curvature of the arcuate weighing beam 40 is on the same side thereof as the pivotal mounting of the link 44, so that the roller rides always upon the concave side of the beam. With this arrangement, as the beam rises, the curvature thereof causes the roller to be raised a progressively increasing amount beyond that which would apply with a straight beam, so that the opposing moment due to the roller is correspondingly increased to maintain the approximate proportionality desired.

Where tubes of a batch of the same cross-section are being classified or graded, it is obviously important to compensate for varying lengths of the tube. It could clearly happen that two tubes might have the same weight per unit length, but the absolute length measurement of the tubes could differ. Thus for example, one end of one tube might have been accidentally broken. Since it is a requirement of the machine of the invention to assess the weight per unit length of tube, in a batch of nominally identical tubes, the gauging of length of individual tubes and the setting of the weighing device to compensate for the length variation, is an important feature. In the position of the machine shown in Figure 5, the arm 77 is resting against its stop and is in a location corresponding to more than maximum tube length. The movement of the arm 77 to contact a tube produces in the manner described a proportional translational movement of the weighing frame having the longitudinal members 47 and 48. Hence the block 45 is correspondingly translationally moved to the left as seen in Figure 5. Hence the roller 43 is caused by the beam 44 to take up a position along the link 46 towards the left-hand end thereof (as viewed in Figure 5). In the position of the machine shown in Figure 2, it will be realised that a relatively great angular movement of the arm 77 will cause only a small translational displacement of the weighing frame, because the roller 60 is contacting the arm 69 near the pivotal axis 68. Nevertheless, the setting of the roller 43 will be such that the shorter the tube that is being measured, the nearer the roller 43 will approach the pivotal support of the beam 40. Hence a compensation for varying tube lengths is obtained.

In the described example, the machine can be set for classifying five different cross-sections (in practice diameters) of tube. These five different diameters correspond to five settings of the machine where the small pivotal lever 63 is engaged in any one of the five forked arms 62. The setting shown in Figure 2 is that corresponding to the smallest diameter (and hence lightest) tube. If the collar 55 is released from the fork by swinging the small lever 63 upwardly, the collar 55 can then be displaced so as to engage any one of the other forks. It will be observed that when the collar 55 is moved, the T-member of which it forms a part also moves including the arm 54, and additionally the rod 53 is moved relatively to the movable frame so as to displace the block 45 along the rod 46. Thus the roller 43 is adjusted along the curved weighing beam to a situation appropriate to the anticipated weight of the tubes. As the roller 43 is brought more distant from the pivot of the beam, it will be obvious that a heavier tube will be required to effect a corresponding lifting displacement of the beam 40 with the aid of the cable 38. It will be recalled that the plate having the inclined face 65 is carried by the T-member possessing the collars 55 and 56 and the arm 54. Thus when the collar 55 is moved relative to the weighing frame, the inclined face 65 is similarly moved relative to the contact piece 64 which bears thereon. In moving the face 65 to the right (as seen in Figure 2), it is clear that the rod 59 will move angularly about its pivotal support upon the arm 57, under the action of the contact piece 64. Thus the roller 60 will then engage the arm 69 at a point that is correspondingly more distant from the axis of the spindle 68. It will now be realised that for a given angular displacement of the length measuring arm 77, the extent to which the movable weighing frame is translated will be a function of the distance between the point of contact of the roller 60 with the arm 69, and the axis of the spindle 68. Thus the weighing device is compensated by a factor concerned with difference in tube length, as automatically modified by a factor concerned with tube cross-section (diameter).

In the construction of the machine it is desirable to introduce a means for damping any oscillation that might tend to occur in the weighing mechanism. Oscillation could take place if when a tube is dropped upon the weighing arms, the momentum due to the tube should cause the arms to fall rapidly to a point lower than that corresponding to correct balance against the resisting moment of the weighing beam. Clearly then, the tube would tend to rise towards its correct position and a series of slight oscillations could follow. This method of operation would render the machine slow and possibly inaccurate. It is therefore desirable to attach a damping device to the weighting arms. The damping device takes the form of the dash-pot 35 the plunger of which is pivotally secured to the weighing arm 33. The dash-pot is of the type which initially resists motion but which has a diminishing resistance to motion when, in fact, set in motion. Thus when the tube undergoing weighing falls upon the weighing arms, the tendency for the arms to move rapidly due to the momentum of the tube is off-set by the initial resistance of the dash-pot. After the initial check in the movement of the arms, they move smoothly down to a position where a correct balance is obtained without oscillation.

In the general description of the operation of the machine so far given, it has been shown how a tube is weighed by being placed upon the weighing arms and balanced against the moment of the roller 43 upon the beam 40. With the correct adjustment of the machine for the cross-section of the tube, and with the automatic length compensation set into the weighing device, the arms 32 and 33 supporting the tube will move down to a particular location determined by the weight per unit length of the tube. As seen best in Figure 4, the arms 32 and 33 can move down to a position where a tube supported on the free ends thereof, lies opposite the mouth of any one of seven available chutes. If it is supposed for example that the arms move to the position where the tube thereon lies opposite the third chute down, viz., the chute indicated by the arrow X in Figure 4, then as soon as the follower 29 begins to fall down the sloping face 28B of the cam 28, the arms 16 and 16A will move forward to displace the tube from the weighing arms 32 and 33 into this chute. Simultaneously the arm 16A will release the pressure upon the spring 86 and permit the pawl 82 to be withdrawn from the teeth 81 upon the rack segment 80. The rack segment is now free to move, and because the spring 67 is free to act, the displaceable weighing frame will move under the action of this spring causing the rod 59 to press against its arm 69, thereby restoring the length measuring arm 77 to the initial position shown in Figure 2.

It will be realised that in the initial setting up of the machine, an adjustment of the weighing device must be made so that for all the various cross-sections of the tubes that are to be inspected, the centre of the range of selection for each cross-section does in fact approximate to the centre chute of the superposed chutes. In practice if the adjustment is made for the greatest and least tube cross-sections the intermediate values will be automatically adjusted.

It is to be particularly noted that the machine of the invention acts in the manner of a comparator and grades the tubing according to the nearest of the selected grades. No indicating mechanism is described for showing actual tube weights per unit length. For many industrial applications, indication apparatus would not be required, but if so desired calibrated apparatus of this nature could be included in the machine.

I claim:

1. A machine for classifying tubes, rods and like pieces of stock according to the weight per unit length of the pieces of stock, comprising means for individually feeding a piece of stock from a group of pieces to a measuring station, a measuring member at said measuring station displaceable from a datum position to a length measuring position to measure the length of a piece of stock that is being fed, at least one weighing arm positioned to support a piece of stock fed thereto in engagement with the measuring member, means supporting said arm for vertical movement under the action of the weight of the piece of stock, a weighing beam having a fixed pivotal axis near one end, a connection between the free end of the weighing beam and said weighing arm to reverse the relative movements and ensure that said free end is raised when the weighing arm is depressed under the action of the weight of a piece of stock, a rolling weighing member upon said beam exerting a moment thereon tending to prevent the raising of the free end thereof, a link having one end attached to said rolling weighting member, a movable support fixed to the other end of said link for pivot movement about an axis, the support being spaced above the rolling weighing member by a distance ensuring that the link is inclined to the weighing beam, and transmission mechanism effectively disposed between said measuring member and said movable support to adjust the position of the latter and thereby vary the horizontal distance between the pivotal axes of the weighing beam and said link according to the length measurement of the piece of stock that is being weighed.

2. A machine according to claim 1, in which the said weighing beam is curved in regard to the surface upon which said weighing member rolls, the centre of curvature of the beam being on the same side thereof as the weighing member, and the curvature being chosen to ensure that the displacement of the weighing arm under the action of the weight of a piece of stock may have a substantially simple proportional relation to the weight per unit length of the piece of stock.

3. A machine as claimed in claim 1, in which said transmission mechanism includes an adjusting member which can be set to any one of several positions according to the nominal cross-section of the stock that is to be classified, such member being connected with said support to ensure that the latter is correspondingly adjusted, and said transmission mechanism further including means for varying the velocity ratio thereof under control of said adjusting member to ensure that the velocity ratio is correspondingly determined for the nominal cross-section of the stock that is to be classified.

4. A machine for classifying tubes, rods and like pieces of stock according to the weight per unit length of the pieces of stock, comprising means for individually feeding a piece of stock from a group of pieces to a measuring station, a measuring member at said measuring station displaceable from a datum position to a length measuring position to measure the length of a piece of stock that is being fed, weighing arms positioned to support a piece of stock fed thereto in engagement with the measuring member, means supporting said arms for vertical movement under the action of the weight of a piece of stock, a weighing beam having a fixed pivotal axis near one end, a connection between the free end of the weighing beam and said weighing arms to reverse the relative movements and ensure that said free end is raised when the weighing arms are displaced downwardly under the action of the weight of the piece of stock, a roller weighing member upon said beam, and imparting a progressively increasing torque thereto opposing the raising of the free end thereof, a link having one end attached to said roller, a displaceable weighing frame, a support carried by said frame, a pivotal connection between said support and the other end of said link, the support being spaced above the roller by a distance ensuring that the link is inclined to the weighing beam, a transmission mechanism effectively disposed between said measuring member and said weighing frame to adjust the position of the latter and thereby vary the horizontal distance between the pivotal axis of the weighing beam and said pivotal connection according to the length measurement of a piece of stock, whereby said weighing arms are displaced under the weight of a piece of stock by a distance which is proportional to the weight per unit length of the stock as determined by the travel of said roller along the beam when the latter rises to the balance point, and deflecting means for deflecting a piece of weighed stock from said weighing arm to a delivery station.

5. A machine as claimed in claim 4, in which said transmission mechanism comprises a rod pivotally secured at one end to said frame, an arm coupled to experience the measuring displacement of said measuring member, and means for holding the other end of said rod in engagement with said arm at distances remote from the axis of movement thereof chosen according to the cross-sectional area of the stock that is to be classified, thereby to achieve corresponding velocity ratio adjustment of the transmission.

6. A machine as claimed in claim 4, in which said support is adjustable in the weighing frame to permit adjustment of the horizontal distance between the pivotal axis of the weighing beam and the pivotal connection of said link.

7. A machine for classifying tubes, rods and like pieces of stock according to the weight per unit length of the pieces of stock, comprising a hopper or magazine for the stock to be classified, means for individually feeding a piece of stock automatically from said hopper or magazine to a measuring station, a measuring member at said measuring station displaceable from a datum position to a length measuring position to measure the length of a piece of stock that is being fed, at least one weighing arm positioned to support a piece of stock fed thereto in engagement with said measuring member, means supporting said arms for vertical movement under the action of the weight of a piece of stock fed thereto, a weighing beam having a fixed pivotal axis near one end, a connection between the free end of the weighing beam and said weighing arm to reverse the relative movements and ensure that said free end is raised when the weighing arm moves downwardly under the action of the weight of a piece of stock thereon, a rolling weighing member upon said beam, a link having one end attached to said rolling weighing member, a support to which the other end of said link is connected by a pivotal axis, said support being located at a level above the pivotal end of the weighing beam, transmission mechanism effectively disposed between said measuring member and said support to adjust the position of the latter and thereby vary the horizontal distance between the pivotal axes of the weighing beam and the link according to the length measurement of a piece of stock, several chutes one above the other with their mouths opening adjacent the path of movement of said weighing arm, and deflecting means for deflecting a weighted piece of stock from said weighing arm to the appropriate chute mouth.

WILLIAM ROBERT OYSTON.

REFERENCES CITED

The following references are of record in the file of this patent:

UNITED STATES PATENTS

| Number | Name | Date |
|---|---|---|
| 1,281,090 | Snell | Oct. 8, 1918 |
| 1,309,086 | Danner | July 8, 1919 |
| 2,385,038 | Snyder | Sept. 18, 1945 |